E. ROBBINS.
Scroll Saw Mill.
No. 76,349.
Patented April 7, 1868.
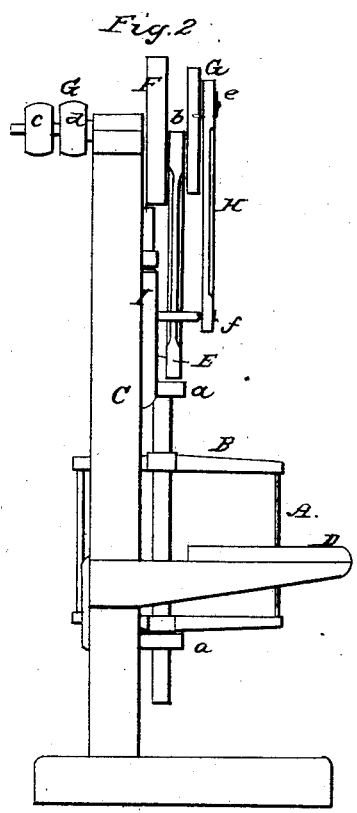
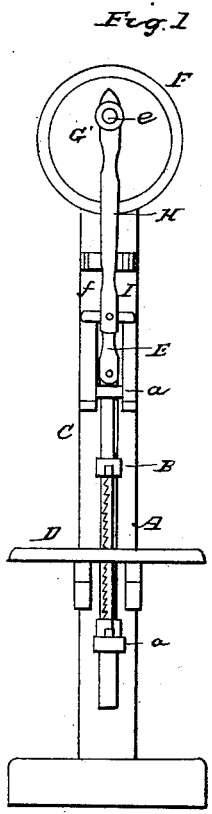
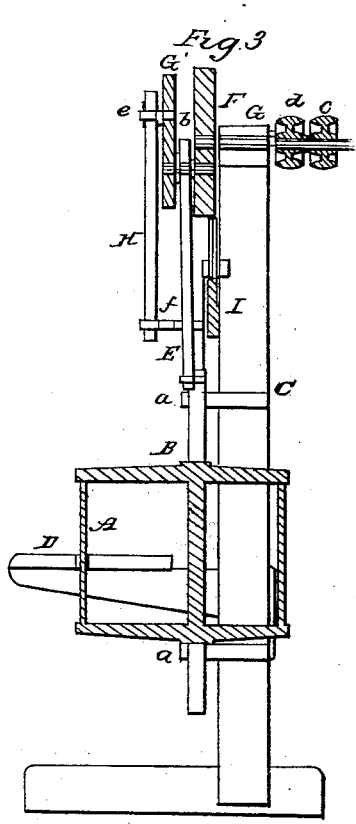
WITNESSES
R. Hale Jr
J. R. Snow
INVENTOR
Elisha Robbins.
by his attorney
R. H. Eddy

United States Patent Office.

ELISHA ROBBINS, OF WORCESTER, MASSACHUSETTS.

Letters Patent No. 76,349, dated April 7, 1868.

IMPROVEMENT IN SCROLL-SAW MILLS.

*The Schedule referred to in these Letters Patent and making part of the same.*

TO ALL PERSONS TO WHOM THESE PRESENTS MAY COME:

Be it known that I, ELISHA ROBBINS, of the city and county of Worcester, and State of Massachusetts, have made a new and useful invention having reference to Jig-Saws, or other saws of like character; and I do hereby declare the same to be fully described in the following specification, and represented in the accompanying drawings, of which—

Figure 1 is a front elevation,

Figure 2 a side elevation, and

Figure 3 a vertical section of a jig-saw and its operative mechanism, with my invention applied thereto.

The object of my invention is to counterbalance the saw during its movements, so as to prevent the usual shaking or jarring of the frame, and the parts to which it may be attached.

Attempts have been made to counterbalance a saw, by applying to its driving-crank a weight, to project from an arm or plate extending from the axis of the crank, but such attempts have failed, because the action of the centrifugal force, when the weight and crank were in revolution, was such as to impel the weight in a direction at right angles to the crank. Thus, when the crank was in the act of passing either of the "dead-points," the momentum of the weight, instead of being exerted in a direction opposite to that of the motion of the saw, as it should be, in order to counterbalance the saw, was exerted at a right angle thereto, and there was a failure to effect the balancing of the saw.

In carrying out my invention, I combine a sliding counterbalance-weight, a connecting-rod, and its operative crank, or their equivalents, with the saw and frame, and the operative mechanism thereof.

In the drawings, A denotes a jig-saw fixed in a frame, B, which slides vertically in suitable guides, $a$ $a$, projecting from a post, C, from which a table or platform, D, is projected, for supporting the material to be sawed. The saw extends through a hole in the said table.

The upper part of the saw-frame is jointed to a connecting-rod, E, which, at its upper end, plays on the wrist $b$ of a crank or wheel, F, fixed on a driving-shaft, G. The said shaft is supported in bearings at the top of the post C, and has a fast pulley, $c$, and a loose pulley, $d$, arranged on it. There is also attached to the wrist of the crank-wheel F, another crank or wheel, G', having a wrist, $e$, extended from it, at the same distance from its centre as the wrist $b$, but on the opposite side of such centre.

From the wrist $e$ another connecting-rod, H, of the same dimensions and weight as the first-mentioned connecting-rod, E, is extended downward, and jointed to a wrist or arm, $f$, projecting from a weight, I, arranged so as to slide vertically against the front face of the post C, such weight being equal to that of the saw and its frame. While the saw is in movement this weight will always move vertically, in a contrary direction to that which the saw may have, and the two connecting-rods, as well as their cranks, will also move in opposite directions with respect to each other. Thus one crank will counterbalance the other. The same may be said with respect to the connecting-rods, and the saw will run smoothly, or without any material jar, whatever may be the velocity of motion imparted to it. Thus, it may be operated with a much higher speed than it is usual to impart to such saws, and therefore will do much more, or a corresponding increase of work in a given time.

My invention may also be applied to reciprocating saws of common saw-mills, and also to various other devices, when moved rectilinearly with reciprocating motions, by means of a connecting-rod and crank.

I do not claim, for the purpose of counterbalancing a saw, the application to its driving-crank, or the shaft thereof, of a weight simply, the same being to project from an arm or plate extending from the axis of the crank or the shaft; nor do I claim counterbalancing a wheel by lead or other suitable metal, forced into a chamber in the rim of the wheel, when the said metal is used with braces, arranged as set forth in the specification of Patent, No. 34,972; nor do I claim anything described in the specification of such patent, as my invention has no reference to the counterbalancing of wheels, or devices having a rotary motion merely, it being for counterbalancing a saw and its frame, when moved rectilinearly with a reciprocating motion, by means of a crank, and a connecting-rod extending from such crank to the saw-frame.

I claim as my invention—

The combination of the sliding counterbalance-weight, its connecting-rod and operative crank, with a saw and frame, and the connecting-rod and crank thereof, the whole being constructed and arranged to operate substantially as specified.

ELISHA ROBBINS.

Witnesses:
R. H. EDDY,
F. P. HALE, Jr.